United States Patent

[11] 3,625,543

| [72] | Inventor | Donald H. Wolff<br>Farmington, Mich. |
|---|---|---|
| [21] | Appl. No. | 857,774 |
| [22] | Filed | Sept. 15, 1969 |
| [45] | Patented | Dec. 7, 1971 |
| [73] | Assignee | Eaton Yale & Towne Inc.<br>Cleveland, Ohio |

[54] SAFETY APPARATUS
3 Claims, 3 Drawing Figs.

| [52] | U.S. Cl. | 280/150 AB |
|---|---|---|
| [51] | Int. Cl. | B60r 21/08 |
| [50] | Field of Search | 280/150<br>AB, 150 B |

[56] References Cited
UNITED STATES PATENTS

| 3,451,693 | 6/1969 | Carey | 280/150 AB |
|---|---|---|---|
| 3,476,402 | 11/1969 | Wilfert | 280/150 AB |
| 3,506,281 | 4/1970 | Berryman | 280/150 AB |
| 3,525,536 | 8/1970 | Pruneski | 280/150 AB |
| 3,514,124 | 5/1970 | Richardson | 280/150 AB |

FOREIGN PATENTS

| 609,624 | 9/1960 | Italy | 280/150 AB |
|---|---|---|---|

Primary Examiner—Benjamin Hersh
Assistant Examiner—John A. Pekar
Attorney—Yount and Tarolli ABSTRACT: A safety apparatus for protecting an occupant or occupants of a vehicle during a collision includes a confinement having a collapsed condition and an expanded condition for restraining movement of the occupant during an accident. The safety apparatus also includes structure providing a fluid supply for inflating the confinement and a diffuser means in fluid communication with the structure and the confinement to direct fluid from the structure to expand the confinement from the collapsed condition to the expanded condition. The safety apparatus also has a housing means, a portion of which defines a chamber for receiving the diffuser means and the confinement when in the collapsed condition. The housing means also includes means for attaching the fluid supply externally thereof. The safety apparatus is constructed as a unitized assembly for installation in a vehicle.

PATENTED DEC 7 1971　　3,625,543

INVENTOR
DONALD H. WOLFF

BY Yount and Tarolli
ATTORNEYS

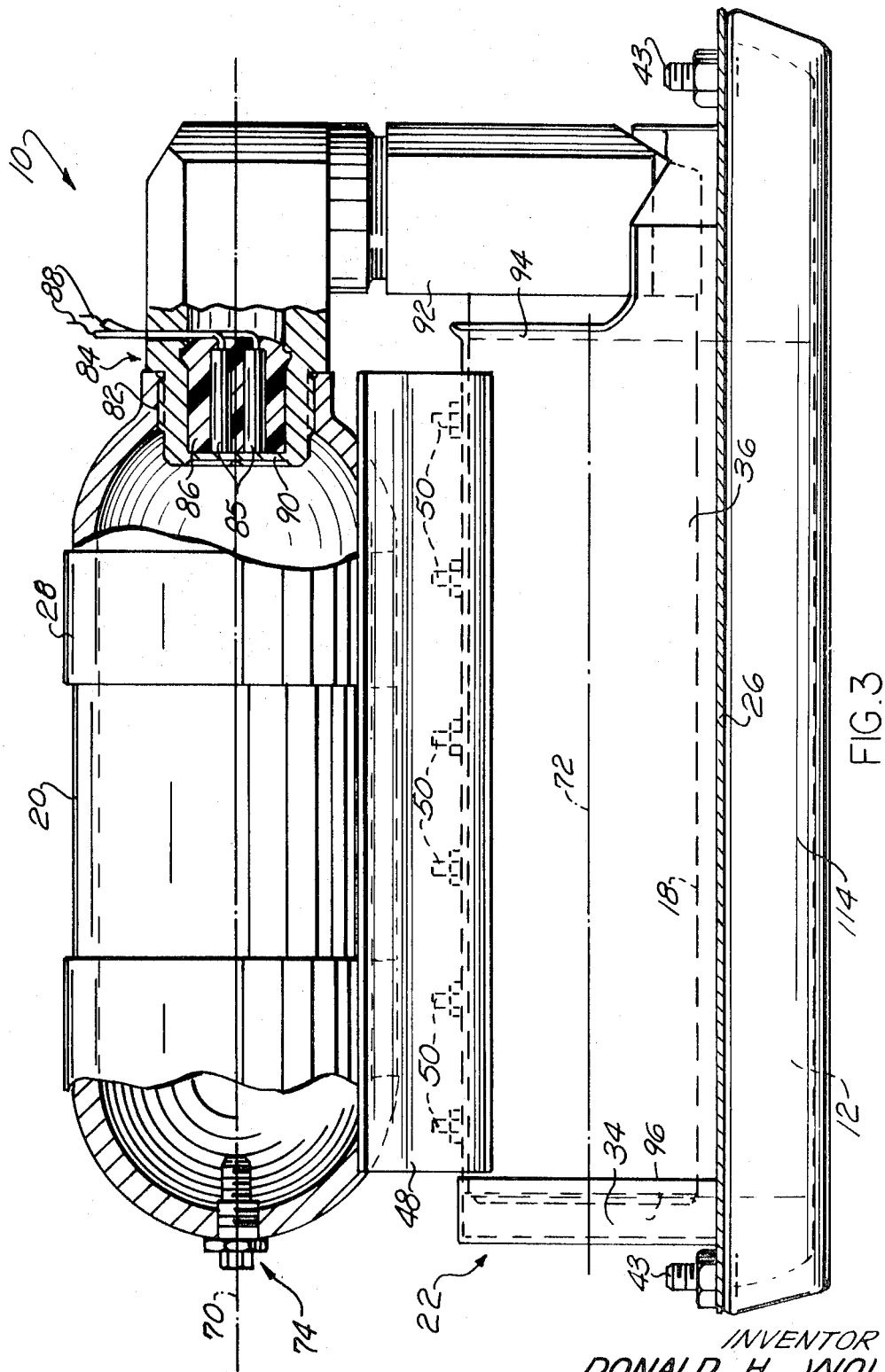

SAFETY APPARATUS

The present invention relates to a vehicle safety apparatus for protecting the occupant of a vehicle and more particularly relates to a safety apparatus of a unitized construction for mounting in a vehicle.

Known safety devices include a confinement which is inflated by fluid which is directed into the confinement by a diffuser from a reservoir. The inflated confinement protects the occupant of a vehicle by restraining his movement as a result of an accident, thereby minimizing the impact of the occupant against structural parts of the vehicle. Such safety devices are shown in copending applications Ser. No. 789,744, and Ser. No. 674,810, now U.S. Pat. No. 3,539,200 assigned to the assignee of the present invention.

In the past, the reservoir, diffuser, and confinement have been located in a chamber defined by a housing member. The housing member is attached to or forms a part of the vehicle such as a steering wheel as shown in patent application Ser. No. 674,810. When such a safety device is constructed in such a manner with the reservoir located inside the housing, an undue amount of internal pressure is created on the housing as a result of the forces exerted by the expanding fluid. Since such a housing must necessarily define a chamber having a greater volume than if the reservoir was not present therein, the area presented to the expanding gas would be decreased if the reservoir were removed therefrom. In addition, a significant amount of material and number of forming steps are required to manufacture a housing large enough for the reservoir to be located therein.

Furthermore, by properly constructing such a housing, the housing can operate to guide the confinement from its collapsed inoperative condition to its expanded condition. It is important that the confinement be guided for movement between these two positions in order for the confinement to freely expand to the expanded condition.

It is also desirable that such a safety apparatus be of a unitized construction such that it can be easily mounted in association with a dashboard or other parts of the vehicle and attached thereto. In this manner, the reliability can be built into the unitized construction without requiring particular care to be given to the assembly of the safety apparatus in the vehicle on the auto manufacturer's assembly line.

The present invention overcomes the above-noted problems by providing a safety apparatus for protecting the occupant of a vehicle and which has a unitized construction for mounting on a member of the vehicle. The present invention includes a housing defining a chamber for receiving a diffuser and confinement therein. The housing also includes means for attaching a reservoir thereto so that the safety apparatus has a unitized construction.

The confinement normally is in a collapsed inoperative condition and may be expanded to an expanded operative condition to protect the occupant of a vehicle when fluid is directed from the reservoir to the diffuser and thereby diffused into the confinement. The present invention includes valve means to release the pressurized fluid from the reservoir which is actuated by a sensor which senses the occurrence of an accident and opens a valve in the reservoir.

By assembling the entire unit as above defined with the reservoir exterior of the chamber defined by the housing member, it is possible to decrease the internal forces set up on the housing when the fluid is released to expand the confinement as well as enabling a decrease in the cost of manufacturing the housing. In addition, the present invention maintains the longitudinal axis of the reservoir substantially parallel to the longitudinal axis of the diffuser such that the unitized safety apparatus assembly will require a minimum amount of space in the vehicle. Furthermore, the safety apparatus of the present invention includes a housing which guides the confinement as it expands and thereby provides for free expansion of the confinement.

Accordingly, it is a principal object of the present invention to provide a new and improved safety apparatus having a unitized construction for mounting on a member of a vehicle and which is simple in construction and may be readily attached to the member of the vehicle.

A further object of the present invention is the provision of a new and improved safety apparatus of a unitized construction for mounting on a member of a vehicle and having a housing defining a chamber in which a diffuser and a confinement are contained when the confinement is in a collapsed inoperative position and wherein the housing has means for attaching the reservoir externally to the housing such that the reservoir is in fluid communication with the diffuser.

Yet another object of the present invention is the provision of a new and improved safety apparatus of a unitized construction for mounting on a member of a vehicle and which includes a housing defining a chamber for receiving a diffuser and a confinement having a collapsed position and an expanded position wherein the housing is designed to guide the confinement as it moves from the collapsed position to the expanded position.

A still further object of the present invention is the provision of a new and improved safety apparatus of a unitized construction for mounting on a member of a vehicle and which includes a housing defining a chamber for receiving a diffuser and a confinement therein and further including means for attaching a reservoir thereto externally of the chamber so as to minimize the internal forces on the housing created during expansion of the confinement.

Yet another object of the present invention is to provide a safety apparatus of a unitized construction for mounting on a member of a vehicle and which may be located in a relatively small compact space so as to thereby provide for mounting in the vehicle without taking up otherwise needed space.

Further objects and advantages of the present invention will be apparent from the detailed description of the present invention made with reference to the accompanying drawings wherein.

Figure 1:
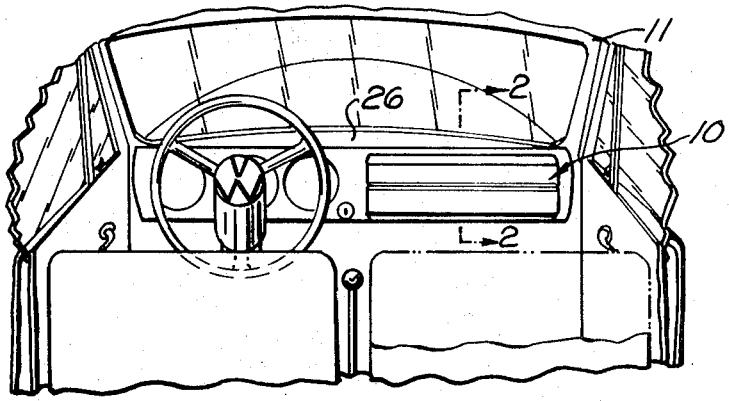
FIG. 1 is a perspective view of a portion of an automobile showing a safety apparatus mounted therein.
Figure 2:
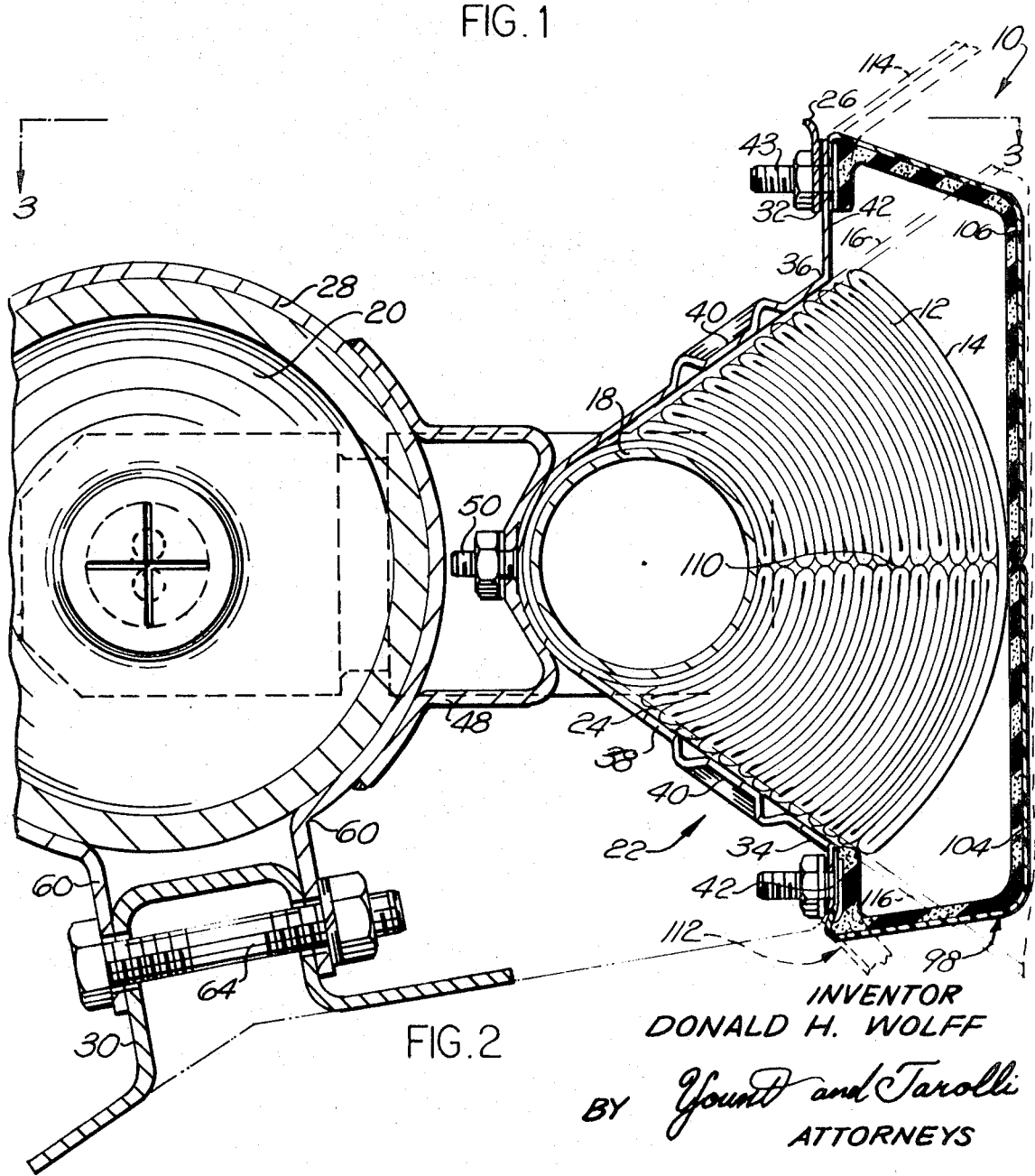
FIG. 2 is a sectional view of the safety apparatus shown in FIG. 1 taken along lines 2—2 thereof.

FIG. 3 is a view of the safety apparatus shown in FIG. 2 taken along lines 3—3 thereof. The present invention provides a new and improved safety apparatus for protecting an occupant of vehicle during a collision. The safety apparatus includes a confinement having a collapsed inoperative condition and an expanded operative condition. The confinement when in its expanded operative condition is operable to restrain movement of an occupant of a vehicle during a collision. The confinement is expanded by the flow of fluid from a fluid reservoir which may release the fluid supply to the confinement through a diffuser. The diffuser and confinement are positioned inside a chamber defined by a housing which guides the confinement as it expands. The reservoir is attached to the exterior of the housing. The improved safety apparatus of the immediate invention provides a unitized construction which may be readily assembled to a member of the vehicle. The present invention applies to a safety apparatus of a wide variety of constructions and designs and for purposes of illustration is described and illustrated as applicable to the safety apparatus generally indicated at 10 in FIG. 1.

The vehicle safety apparatus 10 is mounted in an automotive vehicle 11. The safety apparatus 10 is associated with the dashboard 26 of the vehicle 11 and includes confinement 12. The confinement 12 has a collapsed inoperative condition, shown in full lines in FIG. 2, and an expanded operative condition partially shown in dashed lines in FIG. 2. The confinement when in its expanded operative condition will restrain forward movement of an occupant of the vehicle during a collision.

The confinement 12 is expanded by the flow of fluid thereinto. A diffuser 18 is positioned within the confinement 12 and directs fluid to expand the confinement 12. The diffuser 18 is in fluid communication with a reservoir or structure 20 providing a fluid supply for inflating the confinement 12.

A housing means 22 is provided and defines a chamber, generally indicated at 24, which receives the diffuser 18 and confinement 12 therein. When fluid is supplied from the reservoir 20 to the confinement 12 through the diffuser 18, the housing 22 guides the confinement 12 into the expanded condition 16.

The housing means 22 consists of a housing member 34 having walls 36, 38, generally positioned in intersecting planes which diverge as they extend toward the interior of the vehicle 11. Reinforcing ribs generally indicated at 40 are provided on the walls 36, 38 to increase the structural rigidity of the housing member 34. Openings are provided in flanges 42 of the housing member 34 for receiving fastener 43 for attachment of the safety apparatus 10 to the dashboard 26.

The housing means 22 also includes a bracket 48. The bracket 48 is attached to the reservoir 20 and is also attached to the housing member 34 by means of fasteners 50 attached to the housing 34. The fasteners 50 extend through openings in the bracket 48 and nuts with complementary washers engage the threaded fasteners 50 to attach the bracket 48 to the housing member 34.

The bracket 48 is secured to a bracket 28 which is provided for mounting the unitized construction in the vehicle. The bracket 28 extends about the peripheral extent of the reservoir 20 and includes tabs 60 having apertures therein. The bracket 28 is adapted to be secured to a bracket 30 secured to the vehicle. The bracket 30 is attached to a vehicle member, such as the dashboard 26, by any conventional means such as a weldment. Portions of the bracket 30 extend upward, as shown, and have apertures complementary with the apertures in the mounting member or bracket 28 such that threaded fasteners 64 may extend therethrough. Nuts engage the threaded fasteners 64 to secure the members 28 and 30 together.

The reservoir 20 is of a generally cylindrical configuration having a longitudinal axis generally indicated at 70, as shown in FIG. 3. The bracket 48 positions the reservoir 20 such that the longitudinal axis 70 of the reservoir 20 is substantially parallel to the longitudinal axis 72 of the diffuser 18. By so positioning the reservoir 20 with respect to the diffuser 18, it is possible to minimize the space required for the safety apparatus 10 of the immediate invention. The fluid flows from the reservoir 20 through a fluid conduit 92 into the diffuser 18.

The above-described configuration presents a safety apparatus that is compact and has a unitized construction that is easy to assembly in a vehicle in an operative position. This simplifies the assembly for the automotive manufacturer and minimizes the space which is required to receive the safety apparatus 10. Thus, the safety apparatus 10 has a unitized construction in which the axis 70 of the reservoir is substantially parallel to the longitudinal axis 72 of the diffuser providing a U-shaped configuration in which the fluid flows from the reservoir 20 through the conduit means 92 into the diffuser 18 to expand the confinement 12.

The reservoir 20 in one end thereof has a filling valve arrangement 74 for filling the reservoir 20. At the other end of the reservoir a valve means 84 is provided for releasing the fluid for flow into the diffuser 18. This end of the reservoir has an opening 82 therein and the valve means 84 is threadedly engaged therein. The valve means 84 may be of any conventional construction known to those in the art, and preferably is as shown in Ekstrom patent application, Ser. No. 730,024, now U.S. Pat. No. 3,567,245 assigned to the assignee of the present invention.

Generally the valve means 84 includes an explosive charge 85 supported in resilient material 86. A wall 90 prohibits the pressurized fluid in the reservoir 20 from escaping through the opening 82. The explosive charges 85 are connected by suitable leads 88 to a sensing device which senses a condition indicating that the vehicle 11 is encountering a collision or that a collision is imminent.

When such a condition is sensed, the circuit is completed through the conductors 88 effecting detonation of the explosive charges 85. Upon detonation of the explosive charges 85, the material 86 fragments or crumbles and loses all of its structural strength. In addition, the explosive charges 85 break the wall 90 such that the fluid under pressure in the reservoir 20 is allowed to flow through the opening created by detonation of the explosive charges 85.

The reservoir 20 is connected to the conduit means 92 which is attached to the value means 84 to allow the fluid to flow from the reservoir 20 to the diffuser 18. The conduit means 92 is connected to the diffuser 18, such that upon release of the fluid under pressure in the reservoir 20, the fluid immediately flows into the diffuser 18 and creates expansion of the confinement 12.

The diffuser 18 has a plurality of openings which are spaced apart along the longitudinal axis 72 of the diffuser 18 and which direct the flow of fluid outwardly thereof and directly into the confinement 12. When the fluid is flowing under pressure from the reservoir 20 through the conduit means 92 into the diffuser 18 and out of the diffuser 18 into the confinement 12, there is a reaction force set up by the expansion of the confinement 12. To minimize the effect of these reaction forces, the cross-sectional area of the housing means 22 presented to the confinement 12 is minimized while the walls 36, 38 guide the confinement 12 as it freely expands from the collapsed condition 14 to the expanded condition 16. This is accomplished by positioning the reservoir 20 exteriorly of the chamber 24 defined by the housing means 22.

The confinement 12 is designed to receive the diffuser 18 as shown in FIG. 3 and has an opening 94 at one end thereof for receiving the diffuser 18. The opening 94 includes sealing means to seal the diffuser 18 with respect to the exterior of the confinement. An end member 96 is positioned on the end of the housing member 34 and has a complementary configuration to be mounted with the housing member 34. It should be understood that the end member 96 is a part of the housing means 22.

When the confinement 12 is positioned in the collapsed inoperative condition 14 in the chamber 24, the cover member 98 is positioned to enclose the confinement 12. The cover 98 has openings 99 which are complementary with the openings of the housing member 34 such that a threaded fastener 43 may be inserted therethrough and retained thereon. The threaded fastener 43 has a threaded portion extending from the housing member 34 to engage complementary openings in the dashboard 26 of the vehicle 11 for assembly of the safety apparatus 10 therewith.

The cover 98 may be a decorative cover and has opposite portions 104 and 106. It should be understood that the portions 104, 106 are centrally joined but this joint may be broken upon expansion of the confinement 12.

The unitized construction of the present invention may be assembled to the dashboard 26 of the vehicle 11 by inserting the safety apparatus 10 through an opening 32 in the dashboard 26 such that the threaded fasteners 43 engage openings in the dashboard 26 adjacent to the opening 32 therein. Threaded nuts are then threaded onto one threaded fasteners 43 to retain the apparatus 10 with respect to the dashboard 26. In addition, the threaded fasteners 64 are inserted through the openings 62 in the bracket 28 and complementary openings in the mounting bracket 30.

The operation of the safety device should be apparent from the above. The aforementioned sensor activates the valve means 84 and detonates the explosive charges 85 to open the valve means 84 and allow fluid to flow from the reservoir 20 through the conduit means 92 into the diffuser 18. As the fluid flows from the diffuser 18 into the confinement 12, the diffuser limits the shock waves created by the opening of the valve means 84 and allows for a steady, even expansion of the confinement 12 from the collapsed condition 14 to the expanded condition 18. As the fluid flows into the confinement in the space generally indicated at 110, a force is created on the cover 98 which separates the portions 104, 106 into two sections and forces them to pivot to the position generally indicated at 112, 114, respectively (see FIG. 2). As the portions 104, 106 pivot to their respective positions 112, 114, the confinement 12 reaches the totally expanded position as indicated at 16. Thus, when the occupant of the vehicle is thrown forward, his forward movement is stopped and he is protected from injury due to impact with a structural member of the vehicle 11.

In view of the foregoing, it is readily apparent that the applicant has provided a new and improved vehicle safety apparatus 10 and particularly a new and improved safety apparatus of a unitized construction for mounting on a member 26 of a vehicle 11.

This safety apparatus 10 includes a confinement 12 having a collapsed condition 14 and an expanded condition 16 for restraining movement of the occupant during an accident. The safety apparatus 10 of the immediate invention includes housing means which defines a chamber 24 for receiving the diffuser 18 and the confinement 12 when in the collapsed condition. The housing means includes means for attaching the fluid supply 20 to the housing means 22. Thus, the safety apparatus of the immediate invention provides a unitized system for attachment to a member 26 of the vehicle 11 and minimizes the space required therefor. In addition, the safety apparatus 10 of the present invention minimizes the internal forces created on the housing means 22 which guides the confinement 12 from the collapsed condition 14 to the expanded condition 16.

What is claimed is:

1. A vehicle safety apparatus for location in an opening in a structural portion of a vehicle, said safety apparatus comprising a unitary construction including a housing member, a confinement located in said housing member, said confinement having a collapsed condition in which it is located in said housing member and an expanded condition for restricting movement of an occupant of a vehicle during an accident, means for expanding said confinement from the collapsed condition to the expanded condition, said means comprising a fluid reservoir and a diffuser member, said diffuser member comprising an elongated member having a longitudinal axis and being located in said housing member and having passage means for directing fluid flow therefrom into said confinement, said fluid reservoir being located outside of said housing member and extending along side said diffuser member, means associated with one end of said fluid reservoir and effecting fluid flow from said fluid reservoir, fluid conduit means for communicating with said one end of said fluid reservoir for directing fluid from said one end of said fluid reservoir in a direction transverse to the longitudinal axis of said diffuser member, and into one end of said diffuser member, said diffuser member, fluid reservoir and said fluid conduit means thereby forming a generally U-shaped configuration, and fastening means for securing said housing member, diffuser member and fluid reservoir together as a unit to enable said unit to be inserted into said opening in the structural portion of the vehicle.

2. A vehicle safety apparatus as defined in claim 1 wherein said unitary structure includes cover means for said housing member and which closes a chamber in which said confinement is located, said cover means including first and second portions which separate to allow said confinement to expand to said expanded condition.

3. A vehicle safety apparatus as defined in claim 1 wherein said housing member has a geometric configuration which guides the expansion of the confinement from the collapsed condition to the expanded condition.

* * * * *